3,224,994
PLASTICIZED ISOTACTIC COPOLYMERS OF
STYRENE AND CHLOROSTYRENE
Robert D. Lundberg, St. Albans, and Frederick E. Bailey,
Jr., Charleston, W. Va., assignors to Union Carbide
Corporation, a corporation of New York
No Drawing. Filed June 25, 1963, Ser. No. 290,329
4 Claims. (Cl. 260—30.6)

This invention relates to semi-crystalline isotactic styrene polymers. More particularly, this invention relates to plasticizable isotatic copolymers of styrene and chlorostyrene. In another and still more particular aspect, this invention relates to plasticized styrene polymer compositions characterized by low cold flow tendencies and good plasticizer retention.

Polystyrene produced by conventional free-radical processes is an amorphous, glassy, brittle polymer at room temperature. Because of the brittleness of the amorphous polystyrene its use is restricted to those applications where a tough or flexible polymer is not required. Attempts to plasticize this amorphous, non-crystalline polystyrene have been unsuccessful because the plasticized product is a concentrated solution of the polymer in the plasticizer that lacks strength and cohesiveness and is subject to "cold flow" under conditions of constant load.

More recently it was discovered that highly-crystalline isotactic polystyrene could be prepared by the use of the well-known Ziegler catalysts. These polymers, melting at temperatures of from about 200 to 230° C., have many properties which suggest potential utility in the production of synthetic fibers. However, these crystalline polymers, like the amorphous polymers, are extremely brittle and, because of poor plasticizer retention properties, cannot be plasticized to form a useful flexible product.

It has been discovered by this invention, however, that certain isotactic, semi-crystalline copolymers of styrene and chlorostyrene, are readily and permanently plasticized with the known vinyl plasticizers to form tough, strong, homogeneous styrene polymer compositions. The suitable styrene/chlorostyrene copolymers can contain from about 10 to about 60, preferably from about 20 to about 40, weight percent polymerized chlorostyrene, with the balance being polymerized styrene. These copolymers are hard brittle resins which have melting points of from about 160° C. to about 200° C.

By the term "chlorostyrene," as employed in the specification and claims, is meant a compound of the formula:

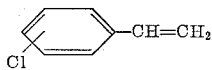

and can be ortho-chlorostyrene, meta-chlorostyrene, para-chlorostyrene or mixtures thereof. Commercially available chlorostyrene normally contains about 60 percent para-isomer, about 25 percent meta-isomer and about 15 percent ortho-isomer and is suitable for producing the copolymers of this invention.

The semi-crystalline isotactic copolymers of this invention are produced by the copolymerization of styrene and chlorostyrene in contact with a catalyst complex of a transition metal compound, as hereinafter defined, and an organo-metallic compound or a metal hydride as hereinafter defined. These "Ziegler-type" catalysts are defined in U.S. Patent No. 2,985,617; however, preferred embodiments are set forth in detail below.

The first component of the catalyst complex is a halide or oxyhalide or mixture thereof of a transition metal of groups IV-B, V-B and VI-B of the Periodic Table of the elements ["Handbook of Chemistry and Physics," 38th ed., Chemical and Rubber Publishing Co., pp. 394–5 (1956)]. Illustrative transition metals are vanadium, titanium, tungsten, zirconium, hafnium, columbium, tantalum, chromium and molybdenum. As examples of suitable transition metal halides and oxyhalides one can mention vanadium tetrachloride, vanadium tribromide, vanadium dichloride, vanadium tetrabromide, vanadium dibromide, vanadium trichloride, vanadium oxydichloride, vanadium oxytrichloride, vanadium pentafluoride, vanadium oxytribromide, zirconium tetrachloride, hafnium tetrachloride, columbium trichloride, tantalum tetrachloride, chromyl dichloride, titanium tetrachloride, titanium dichloride, titanium tetrafluoride, titanium trifluoride, titanium dibromide, titanium tribromide, titanium tetrabromide, tungsten tetrachloride, tungsten hexachloride, molybdenum trichloride and the like, with titanium trichloride and vanadium trichloride being preferred.

The second component of the catalyst complex is an organo-metallic compound or metal hydride of a metal of groups I-A, II-A, II-B and III-A of Periodic Table of the Elements. These compounds may be exemplified by the general formula: $X_bMY_c$, wherein M is a metal from groups I-A, II-A, II-B or III-A of the Periodic Table of the Elements; X is hydrogen, an alkyl radical having from 1 to about 20, preferably from 2 to about 12, carbon atoms, an aromatic hydrocarbon radical containing from 6 to about 12 carbon atoms, or a saturated cycloaliphatic hydrocarbon radical containing from 3 to about 12 carbon atoms; Y is a halogen atom or X; $b$ is an integer having a value of 1 or 2; $c$ is an integer having a value of 0 or 1; and the sum of $b$ plus $c$ equals the valence of the metal M. Illustrative examples of suitable compounds of this type include triisobutylaluminum, trioctylaluminum, tri-n-butylaluminum, triethylaluminum, triisopropylaluminum, tridodecylaluminum, triphenylaluminum, diethylaluminum chloride, diisobutylaluminum chloride, dioctylaluminum chloride, diododecylaluminum chloride, various monohydrocarbylaluminum dihydrides, diethylaluminum, hydride, diisobutylaluminum hydride, dioctylaluminum hydride, didodecylaluminum hydride, diethylberyllium, diisobutylberyllium, dioctylberyllium, diododecyclberyllium, diphenylberyllium, ethylberyllium chloride, isobutylberyllium chloride, octylberyllium chloride, dodecylberyllium chloride, phenyl lithium, naphthyl lithium, isobutyl lithium, cyclohexyl lithium, dodecyl lithium, diethylzinc, diisobutylzinc, dioctylzinc, didodecylzinc, diphenylzinc, ethylzinc chloride, isobutylzinc chloride, dicyclopropylzinc chloride, diisobutylmagnesium, dioctylmagnesium, didodecylmagnesium, diphenylmagnesium, isobutylmagnesium chloride, octylmagnesium chloride, dodecylmagnesium chloride, and the like. The preferred organo-metallic co-catalysts are the trialkyl aluminum compounds having less than 13 carbon atoms in each alkyl chain such as triisobutylaluminum, triethylaluminum, triheptylaluminum and the like.

The molar ratio of the organo-metallic compound to the transition metal compound in the catalyst complex can vary from about 0.1:1 or less to about 10:1 or more. Although the ratio employed is not narrowly critical and may be varied considerably, molar ratios of from about 0.2 to about 2 moles of the organo-metallic compound per mole of transition metal compound are preferred. The concentration of the catalyst complex in the polymerization mixture can vary from about 0.5 to about 5 mole percent of each component per total moles of monomers charged, with from about 0.7 to about 2.0 mole percent of each component per total moles of monomer being preferred.

The rates of polymerization of styrene and chlorostyrene are substantially the same. Accordingly, the comonomers can be charged to the polymerization in the ratio desired in the copolymer; i.e. the amount of chlorostyrene in the charge can vary from about 10 to about 60, preferably from about 20 to about 40, percent, based on total weight of monomers.

It is advantageous, although not essential, to employ an inert liquid hydrocarbon diluent in the polymerization reaction. Illustrative of suitable diluents are inert aliphatic hydrocarbons such as heptane, hexane, cyclohexane, 2-ethylhexane, and the like; or aromatic hydrocarbons such as benzene, toluene, ortho-, meta- and paraxylene, and the like; or mixtures thereof. The hydrocarbon diluent must be substantially free of impurities such as unsaturated compounds, sulfur containing compounds and compounds containing active hydrogen such as alcohols, amines and water. The preferred inert diluents are benzene, toluene, cyclohexane and heptane. The weight ratio of diluent to total monomer weight can vary from as low as about 1:10 up to about 100:1 or higher.

The techniques employed in combining the catalyst, diluent and monomer are the well known procedures designed to exclude moisture. The organo-metallic co-catalyst can be added to the diluent in the reaction vessel prior to the addition of the transition metal co-catalyst; however, these various components can be added in reverse order also. The monomers are then introduced, the vessel sealed, and the reaction mixture is stirred at the desired temperature. Alternatively, the monomer may be introduced continuously at the desired temperature and pressure.

The temperature can vary over a broad range such as 0° C. to 180° C., preferably 25° C. to 120° C. and most preferably from 40° C. to 80° C. Pressure is not critical and is based only on practical consideration of equipment design, and the polymerization can be conducted at atmospheric, superatmospheric, or subatmospheric pressure in agitator-equipped vessel. Thus pressures of 0.1 atmosphere to 100 atmospheres may be used. However, a pressure from about 1 to about 5 atmospheres is preferred. It is preferable to maintain an inert (e.g., nitrogen) atmosphere over the reaction medium. A grinding medium may also be present in the reaction mixture (e.g., glass beads) for the purpose of decimating the catalyst complex and continuously renewing exposed surfaces of the decimated catalyst complex to the monomer.

The period of time during which the polymerization reaction is permitted to proceed is not critical. Thus, periods of as little as 5 minutes or less to 4 hours or several days can be effectively employed, with the degree of conversion increasing with increasing reaction period.

The styrene/chlorostyrene copolymers are recovered from the reaction mixture by methods known to the art.

The plasticizers which are employed in the compositions of this invention are those organic carboxylic acid diesters and those organic triesters of phosphoric acid heretofore employed in plasticizing poly(vinyl chloride). These plasticizers are well known to the art. See A. K. Doolittle, "The Technology of Solvents and Plasticizers," John Wiley & Sons, Inc., pp. 943–1027 (1954), and "Modern Plastics Encyclopedia," pp. 460–77 (1963), for listings of suitable plasticizers.

As examples of the esters of this type one can mention phosphates such as tri-n-butyl phosphate,
triphenyl phosphate,
tricresylphosphate,
tri(2-ethylhexyl)phosphate,
tri(p-tert.-butylphenyl)phosphate,
tri(butoxyethyl)phosphate,
cresyl diphenyl phosphate,
octyl diphenyl phosphate,
o-xenyl diphenyl phosphate, and the like; carbonates such as bis(dimethylbenzyl)carbonate and the like; diesters of dicarboxylic acids such as di(2-ethylhexyl)succinate,
dimethyl phthalate,
diethyl phthalate,
di(2-ethylhexyl)phthalate,
di-n-decylphthalate,
di-tridecyl phthalate,
diphenyl phthalate,
dicyclohexyl phthalate,
di(methoxyethyl)phthalate,
di(butoxyethyl)phthalate,
di(ethoxyethoxyethyl)phthalate,
n-butyl benzyl phthalate,
n-octyl n-decyl phthalate,
di(2-ethylhexyl)hexahydrophthalate,
di(2-ethylhexyl)tetrahydrophthalate,
diisobutyl adipate,
di(2-ethylhexyl)adipate,
dinonyl adipate,
di(butoxyethoxyethyl)adipate,
di(butoxyethoxy) adipate,
n-octyl n-decyl adipate,
di(2-ethylbutyl)azelate,
di(2-ethylhexyl)azelate,
dimethyl sebacate,
di-n-butyl sebacate,
di(2-ethylhexyl)sebacate,
dibenzyl sebacate,
di(butoxyethyl)sebacate,
n-butyl benzyl sebacate, and the like; diesters of diols and monocarboxylic acids such as diethylene glycol dipelargonate, triethylene glycol di(2-ethylbutyrate), triethylene glycol di(2-ethylhexanoate), triethylene glycol dicaprylate, N,N-bis[2-(2-ethylhexanoyloxy)ethyl]-2-ethylhexanamide and the like; the acetylricinoleates such as methyl acetylricinoleate, methoxyethyl acetylricinoleate and the like; etc.

The esters which are preferred for use in the plasticized compositions of this invention are the tri(hydrocarbyl) phosphates having from about 4 to about 15 carbon atoms in the hydrocarbyl group thereof; and diesters of the formulae:

(III) 

and (IV) 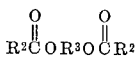

wherein each R, when taken individually is a monovalent hydrocarbon radical of from 1 to about 15 carbon atoms, including alkyl radicals, such as methyl, ethyl, n-butyl, 1,3-dimethylbutyl, 2-ethylbutyl, capryl, isooctyl, 2-ethylhexyl, nonyl, decyl, tridecyl and the like; aryl radicals such as phenyl and the like; cycloalkyl radicals such as cyclohexyl and the like; aralkyl radicals such as benzyl and the like; and alkoxyethyl radicals having from 1 to about 4 carbon atoms in the alkoxy group such as methoxyethyl, ethoxyethyl, butoxyethyl and the like; $R^1$ is a divalent hydrocarbon radical of from about 2 to about 8 carbon atoms, including arylene radicals such as o-phenylene and the like; cycloalkylene radicals such as 1,2-cyclohexylene and the like; cycloalkenylene radicals such as 1,2-cyclohex-4-enylene and the like; and alkylene radicals such as dimethylene, tetramethylene, heptamethylene, octamethylene and the like; $R^2$ is an alkyl radical of from about 5 to about 8 carbon atoms such as 1-ethylpropyl, 1-ethylpentyl, heptyl and the like; and $R^3$ is a divalent radical of the formula $-(CH_2CH_2O)_xCH_2CH_2-$ wherein $x$ is an integer having a value of 1 to 3 inclusive or a divalent N,N-bis(ethylene)alkanamide radical,

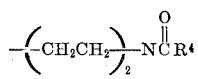

wherein R⁴ is an alkyl group of from about 5 to about 8 carbon atoms such as pentyl, hexyl, 1-ethylpentyl, octyl and the like. By the term "hydrocarbyl" as employed in the specification and claims is meant a monovalent hydrocarbon radical.

The amount of plasticizer can vary from about 10 to about 70 weight percent, based on the weight of the copolymer. At amounts of less than 10 percent the plasticized polymer composition is too brittle for use in films and the like and at amounts of over 70 percent the plasticized composition is too weak for practical uses. Amounts of from about 20 to about 50 percent are preferred for optimum flexibility, toughness and strength.

The plasticizer can be incorporated into the styrene/chlorostyrene copolymer by methods known to the art, such as milling and the like. Although plasticizers such as bis(2-ethylhexyl)phthalate can be incorporated in amorphous polystyrene at about the glass transition point of the polystyrene (about 100° C.) to produce a transparent film, it has been found that an opaque resin is obtained when the styrene/chlorostyrene copolymers are plasticized at these temperatures. However, if the plasticizer and copolymer are milled at temperatures of about the melting point of the copolymer (about 160° C. to 200° C.) a transparent resin is produced. It has also been found that the milling need not be conducted at such elevated temperatures if after milling the plasticized copolymer is heated to about the melting point. If the processing temperature is in excess of about 200° C. for example from 200° C. to 230° C., it is necessary to rapidly quench the resin to produce a transparent product. A translucent resin is produced by slowly cooling the plasticized resin from these elevated temperatures.

The following examples are illustrated:

EXAMPLE 1

A glass, 300-milliliter bottle was charged with 25 milliliters of styrene and 25 milliliters of chlorostyrene (a mixture of the three position isomers containing about 60 percent p-chlorostyrene). The bottle was then cooled to −80° C. and 5 milliliters of a suspension containing 0.5 gram of vanadium trichloride in heptane and 5 milliliters of a 1-molar solution of triisobutyl aluminum in heptane were added. The bottle was sealed and rotated end-over-end for 16 hours in a water bath which was maintained at 25° C. The bottle was removed from the bath, opened, and the contents were slurried in 200 milliliters of isopropanol. After filtering from the methanol and washing twice with 200-milliliter portions of isopropanol, the styrene/chlorostyrene copolymer was dried by heating at 40° C. for 16 hours. The copolymer was suspended in 100 milliliters of tetrahydrofuran, held at 50° C. for 5 days, and precipitated in 600 milliliters of methanol. After filtering from the methanol and drying for 16 hours at 40° C. there were recovered 9 grams of isotactic styrene/chlorostyrene copolymer. The copolymer, containing about 50 percent polymerized styrene, had a melting point of about 180° C. A clear brittle plaque of this copolymer obtained by molding a sample of the resin at 180–200° C. and 4000 p.s.i. was partially crystalline as determined by examination with polarized light.

Samples of this copolymer were plasticized with bis(2-ethylhexyl)phthalate by repeated molding at 150° C. to 180° C. to disperse the plasticizer in the copolymer. Films produced from plasticized samples containing from 20 to 50 weight percent bis(2-ethylhexyl)phthalate were flexible, nearly transparent and possessed fair strength.

EXAMPLE 2

Employing apparatus and procedures similar to those described in Example 1, except that 10 milliliters of chlorostyrene and 40 milliliters of styrene were charged to the reaction, there were produced 3.6 grams of a partially-crystalline, isotactic styrene/chlorostyrene copolymer containing about 20 percent polymerized chlorostyrene. Although a plaque of this copolymer was brittle, films plasticized with bis(2-ethylhexyl)phthalate were flexible and had fair strength.

EXAMPLE 3

Employing apparatus, amounts and procedures similar to those described in Example 1 there were produced 13 grams of a white, solid, isotactic styrene/chlorostyrene copolymer containing about 50 percent polymerized chlorostyrene. To a 2-gram portion of this copolymer there was added 0.5 gram of the diester of 2-ethylhexanoic acid and N,N-bis(2-hydroxyethyl)-2-ethylhexanamide, as a plasticizer. The plasticizer was dispersed in the copolymer by repeated molding at 180–200° C. and 4000 p.s.i. An additional 0.2 gram of the plasticizer was added during the molding operation to replace plasticizer lost during the molding. The plasticizer copolymer composition was flexible, nearly transparent, and exhibited no evidence of exudation or "sweating out" of the plasticizer.

Amorphous polystyrene produced by free-radical polymerization techniques, which plasticized with the diester of 2-ethylhexanoic acid and N,N-bis(2-hydroxyethyl)-2-ethylhexanamide, and held at room temperature became opaque and "cheesey" due to exudation of the plasticizer.

EXAMPLE 4

Employing procedures similar to those described in Example 1, a 300-milliliter bottle was charged with 150 milliliters of styrene and 50 milliliters of chlorostyrene. The bottle was cooled to below 0° C. and 20 milliliters of a suspension containing 2.0 grams of vanadium trichloride in heptane, and 20 milliliters of a 1-molar solution of triisobutyl aluminum in heptane were added. The bottle was sealed and polymerization was conducted at 25° C. for 16 hours. There were recovered 110.9 grams of a pale tan, solid, isotactic styrene/chlorostyrene copolymer containing about 25 percent polymerized chlorostyrene. The copolymer had a reduced viscosity of 4.8 as determined at 138.5° C. using a solution of 0.2 gram of the copolymer in 100 milliliters of cyclohexanone.

The reduced viscosity was determined from the formula:

$$I_R = \frac{I - I_0}{(I_0)(C)}$$

wherein $I_R$ is the reduced viscosity; $I$ is the viscosity of the solution; $I_0$ is the viscosity of the solvent; and $C$ is the concentration of the polymer in the solution in grams per 100 milliliters.

Two 2-gram samples of this copolymer were plasticized with 0.8 gram of bis(2-ethylhexyl)phthalate or 0.8 gram of the diester of 2-ethylhexanoic acid and N,N-bis(2-hydroxyethyl)-2-ethylhexanamide. The tensile strength and stiffness modulus of the plasticized samples were determined according to ASTM D–882–56T and ASTM D–638–56T, respectively.

The results of these tests are set forth in Table I, below, together with data from equivalent tests employing amorphous polystyrene as the polymer.

Table I

| Polymer Composition | Tensile Strength, p.s.i. | Stiffness Modulus, p.s.i. |
|---|---|---|
| 1. Styrene/chlorostyrene copolymer plus— | | |
| (a) bis(2-ethylhexyl) phthalate | 380 | 3,684 |
| (b) N,N-bis(2-ethylhexanoyloxyethyl)-2-ethylhexanamide | 266 | 4,160 |
| 2. Polystyrene plus— | | |
| (a) bis(2-ethylhexyl) phthalate | 104 | 1,570 |
| (b) N,N-bis(2-ethylhexanoyloxyethyl-2-ethylhexanamide | Incompatible | Incompatible |

EXAMPLE 5

Employing apparatus, procedures and amounts similar to those described in Example 4, there were produced 104.2 grams of a white, solid, isotactic styrene/chlorostyrene copolymer containing 25.6 percent polymerized chlorostyrene. Two samples of this copolymer were plasticized with bis(2-ethylhexyl)phthalate or N,N-bis(2-[2'-ethylhexanoyloxy]ethyl)-2-ethylhexanamide to produce compositions containing 50 parts by weight plasticizer per 100 parts by weight copolymer. The "cold flow" properties of these plasticized compositions were tested by suspending a 348-gram weight by a 5.0 cm. x 0.63 cm. x 0.025 cm. strip of the plasticized copolymer. An equivalent test conducted employing amorphous polystyrene plasticized with bis(2-ethylhexyl)phthalate was conducted.

After four minutes the percent elongation of the copolymer plasticized with the amide stabilizer according to this invention was only 20 percent and the elongation of the copolymer plasticized with bis(2-ethylhexyl) phthalate according to this invention was only 35 percent. On the other hand, the elongation of the plasticized conventional amorphous polystyrene was over 100 percent after only 2½ minutes.

What is claimed is:

1. A flexible styrene polymer composition of (a) an isotactic, semi-crystalline copolymer of styrene and chlorostyrene containing from 10 to 60 weight percent polymerized chlorostyrene and the balance being polymerized styrene and (b) from 10 to 70 weight percent, based upon the weight of said copolymer, of a plasticizer selected from the group consisting of (1) tri(hydrocarbyl)phosphates having from 4 to 15 carbon atoms in each hydrocarbyl group thereof and (2) dicarboxylic esters of the formulae:

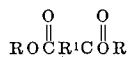

and

wherein each R, when taken individually, is selected from the group consisting of a monovalent hydrocarbon radical of from 1 to 15 carbon atoms, and an alkoxyethyl radical having from 1 to 5 carbon atoms in the alkoxy group thereof; $R^1$ is a divalent hydrocarbon radical of from 2 to 8 carbon atoms; each $R^2$ when taken individually, is an alkyl radical of from 5 to 8 carbon atoms; and $R^3$ is a member selected from the group consisting of a divalent radical of the formula:

$$-(CH_2CH_2O)_x-CH_2CH_2-$$

wherein $x$ is an integer having a value of from 1 to 3, inclusive, and a divalent

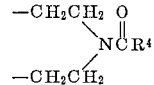

radical wherein $R^4$ is an alkyl radical of from 4 to 8 carbon atoms.

2. A flexible styrene polymer composition of (a) an isotactic, semi-crystalline copolymer of styrene and chlorostyrene containing from 10 to 60 weight percent polymerized chlorostyrene and the balance being polymerized styrene and (b) from 20 to 50 weight percent, based upon the weight of said copolymer, of a dialkylphthalate having from 1 to about 15 carbon atoms in each alkyl radical thereof.

3. A flexible styrene polymer composition of (a) an isotactic, semi-crystalline copolymer of styrene and chlorostyrene containing from 10 to 60 weight percent polymerized chlorostyrene and the balance being polymerized styrene and (b) from 20 to 50 weight percent, based upon the weight of said copolymer, of bis(2-ethylhexyl) phthalate.

4. A flexible styrene polymer composition of (a) an isotactic, semi-crystalline copolymer of styrene and chlorostyrene containing from 10 to 60 weight percent polymerized chlorostyrene and the balance being polymerized styrene and (b) from 20 to 50 weight percent, based upon the weight of said copolymer, of N,N-bis[2-(2-ethylhexanoyloxy)ethyl]-2-ethylhexanamide.

References Cited by the Examiner

UNITED STATES PATENTS

| 2,472,901 | 6/1949 | Johnson et al. | 260—32.6 |
| 2,692,260 | 10/1954 | D'Alelio | 260—91.5 |
| 3,000,845 | 9/1961 | Doak et al. | 260—31.8 |

OTHER REFERENCES

Boundy et al.: Styrene: Its Polymers, Copolymers, and Derivatives, Reinhold Publishing Co., 1952, pages 506–510, 823–825.

Buttrey: Plasticizers, Cleaver-Hume Press, Ltd. 1947, 2d ed., pages 9–12, 83–84, and 186.

MORRIS LIEBMAN, *Primary Examiner.*